United States Patent [19]

Rea

[11] 4,244,107
[45] Jan. 13, 1981

[54] INDIRECT READING INSIDE CALIPER

[76] Inventor: Andrew Rea, 10271 Nottingham, Detroit, Mich. 48224

[21] Appl. No.: 40,513

[22] Filed: May 21, 1979

[51] Int. Cl.$^3$ .......................... G01B 3/20; G01B 5/12
[52] U.S. Cl. ............................... 33/143 J; 33/143 K; 33/159
[58] Field of Search ............ 33/143 R, 143 H, 143 M, 33/143 J, 143 K, 147 R, 147 F, 147 G, 147 T, 147 J, 147 K, 158, 159, 163

[56] References Cited

U.S. PATENT DOCUMENTS

| | | | |
|---|---|---|---|
| 2,645,022 | 7/1953 | Hart | 33/159 |
| 2,824,375 | 2/1958 | Rhodes | 33/143 R |

FOREIGN PATENT DOCUMENTS

| | | | |
|---|---|---|---|
| 588559 | 5/1947 | United Kingdom | 33/143 K |
| 597415 | 1/1948 | United Kingdom | 33/159 |

Primary Examiner—Richard R. Stearns
Attorney, Agent, or Firm—William L. Fisher

[57] ABSTRACT

An improved indirect reading inside caliper which eliminates the need for a plurality of telescoping inside gauges, the inside caliper comprising an elongated body, a pair of measuring fingers and a bracket slidable on the body, respective manually operated fasteners for the fingers and bracket for holding the same in selected positions on the body, one of the fingers and the bracket fastened together so that they slide in unison on the body, a compression spring in the interior of the body operative upon the bracket so as to yieldably urge it toward one end of the body, a manual adjustment associated with the bracket for imparting incremental movement to the one finger relative to the other finger, whereby a range of inside diameters of apertures having size ratios of the order of 1 to 10 may be precisely measured, the body having an axially extending slot therein extending substantially end to end thereof to maximize the maximum distance of travel between the fingers, the slot being V-shaped, each fastener having V-shaped shoulders thereon which engage the slot, whereby to circumferentially align said fingers and bracket on the body, the fastener for the bracket having an inner end which extends into the interior of the body for engaging an end of the compression spring, respective protuberances on corresponding outside faces of the fingers, and the fingers having opposing inside faces thereon ground flat so as to minimize the minimum distance between the protuberances.

1 Claim, 5 Drawing Figures

U.S. Patent   Jan. 13, 1981   4,244,107
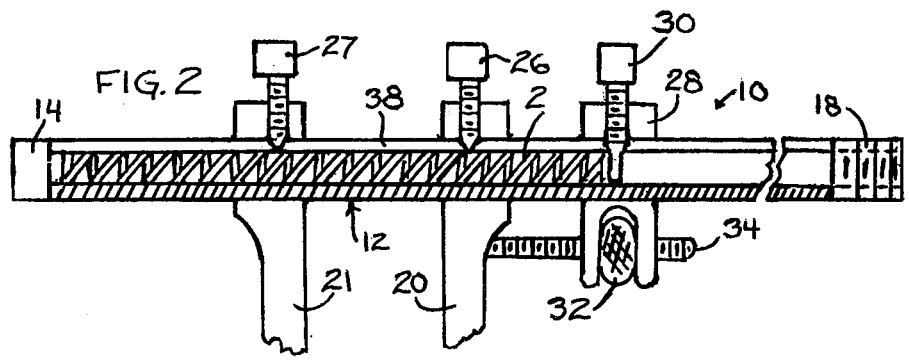
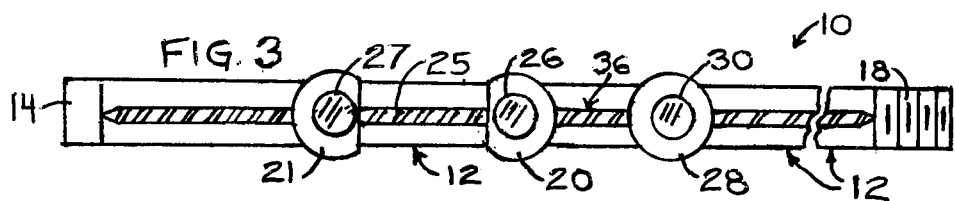
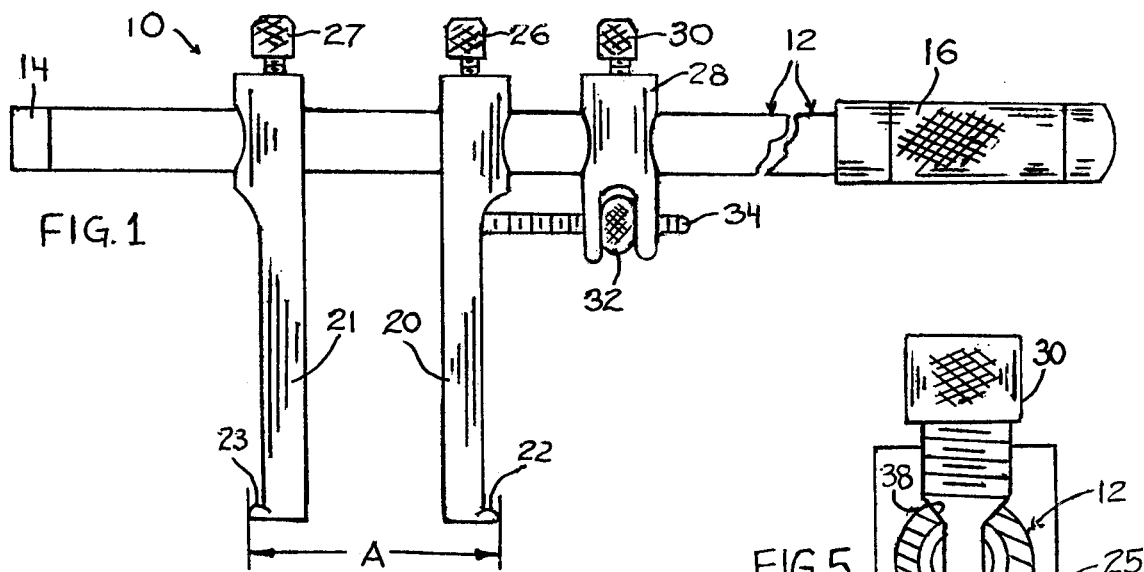
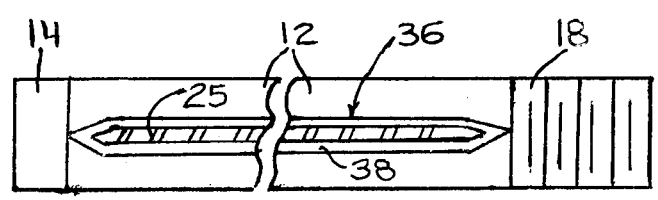
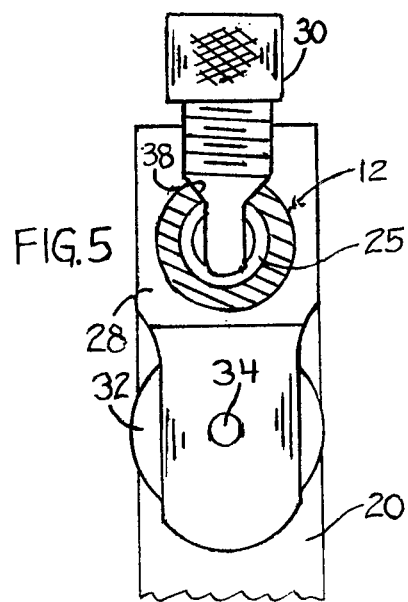

INDIRECT READING INSIDE CALIPER

My invention relates to indirect reading inside calipers.

The principal object of my invention is to provide an improved indirect reading inside caliper which is simple in construction but extremely versatile.

The foregoing object of my invention and the advantages thereof will become apparent during the course of the following description, taken in conjunction with the accompanying drawings, in which:

FIGS. 1 and 3 are, respectively, side elevational and top plan views of an improved indirect reading inside caliper embodying my invention;

FIG. 2 is a view similar to FIG. 1 but with parts removed and in section;

FIG. 4 is an enlarged view of a portion of the structure of FIG. 3; and

FIG. 5 is a vertical sectional view of said embodiment of inside calipers.

Referring to the drawings in greater detail, 10 generally designates said improved inside caliper which comprises a hollow body 12 having a plug 14 at one end and a handle 16 at the other end thereof. Said handle 16 is threadably engaged on said hollow body 12 having a plug 14 at one end and a handle 16 at the other end thereof. Said handle 16 is threadably engaged on said hollow body 12, as at 18. A compression spring 25 is carried in the interior of the hollow body 12. A pair of measuring fingers 20 and 21 are slidably carried on said hollow body 12 via apertures therein and locking screws 26 and 27, respectively, threadably carried in the upper ends thereof. Said fingers 20 and 21 have contact protuberances 22 and 23 thereon, respectively. A bracket 28 is also slidably carried on said hollow body 12 via an aperture therein and a locking screw 30 threadably carried in the upper end thereof. The lower end of the bracket 28 if bifurcated, and accommodates therebetween a knurled nut 32 which is threadably carried on a screw 34 said screw 34 is fastened, as by a press fit or brazing, to the finger 20 and is moveable in apertures in said bifurcations. The hollow body 12 has an axially extending slot 36 ground in the top thereof having tapered sides 38. The locking screws 26, 27, and 30 are provided with tapered shoulders matching the tapered sides 38 so as to insure circumferential alignment of the fingers 20 and 21 and the bracket 28 on the hollow body 12. The lower end of the locking screw 30 extends into the interior of the hollow body 12 and engages an end of said spring 25.

In use of the caliper 10 the finger 21 is first fixed in position on the hollow body 12 by tightening the locking screw 27; the larger the diameter of the aperture to be measured the closer the finger 21 will be positioned toward the end 14. The locking screws 26 and 30 are loosened and the bracket 28 is manually slid on the hollow body 12 until the finger 20 is close enough to the finger 21 so that both fingers can be inserted into the aperture to be measured. Upon insertion of the fingers 20 and 21 into said aperture the locking screw 30 is released and by the action of the spring 27 upon the lower end of the locking screw 30 the bracket 28 and, hence the finger 20, will be yieldably urged away from the finger 21, whereby the contact protuberances 22 and 23 will be urged against and into good contact with the inside walls of said aperture. The bracket 28 is then fixed in position on the hollow body 12 by tightening the locking screw 30; fine adjustment of the position of the contact protuberance 22 relative to the protuberance 23 is obtained by feel of said protuberance 22 against the inside wall of the aperture which is realized by turning of the knurled nut 32. Following such fine adjustment the locking screw 26 is tightened to fix the precise position of the finger 20 on the hollow body 12 relative to the finger 21. The fingers 20 and 21 are then removed from the aperture and the distance between the contact protuberances 22 and 23 thereon, as indicated at A in FIG. 1, is measured by a micrometer or other precision measuring instrument. The minimum measurement for the distance A is realized when the two fingers 20 and 21 are pushed together as close as possible; for this purpose the opposing faces of the fingers 20 and 21 are ground flat as best shown in FIG. 3.

It will thus be seen that there has been provided by my invention an improved inside caliper in which the object hereinabove set forth, together with many thoroughly practical advantages, has been successfully achieved. For example, my improved inside caliper eliminates the necessity of having a plurality of sets of telescoping gauges each having limited capacity for measurement like $\frac{1}{2}''$ to $\frac{3}{4}''$; $\frac{3}{4}''$ to $1\frac{1}{4}''$; $1\frac{1}{4}''$ to $2\frac{3}{4}''$; $2\frac{3}{4}''$ to $3\frac{1}{2}''$; $3\frac{1}{2}''$ to $4\frac{1}{2}''$; $4\frac{1}{2}''$ to $5\frac{1}{2}''$; and so on. My inside caliper covers all of these ranges in a single instrument and is simple and compact in construction and inexpensive to manufacture and yet very efficient in operation. The tapered sides 38 on the slot 36 are preferably 45 degrees and serve a dual function, i.e. to better grip the locking screws 26, 27, and 30 as well as to align the fingers 20, 21 and the bracket 28 on the hollow body 12. The slot 36 extends from end to end of said hollow body to realize a maximum measurement for the distance A so that the inside caliper 10 has the greatest measuring capacity, i.e. of the ratio of 1 to 10 from minimum to maximum. Good contact between the protuberances 22 and 23 and the surface of the bore or other hole to be measured is insured by the action of the compression spring 25 on the bracket 28 and hence on the finger 20. Correct feel for the precise position of the spacing of the protuberances 22 and 23 against the inside diameter of the hole to be measured is attained through turning of the knurled nut 32. While a preferred embodiment of my invention has been shown and described, it is to be understood that changes and variations may be resorted to without departing from the spirit of my invention as defined by the appended claim.

What I claim is:

1. An improved indirect reading inside caliper which eliminates the need for a plurality of telescoping inside gauges, said inside caliper comprising an elongated hollow tubular body, a pair of measuring fingers and a bracket slidable on said hollow tubular body, respective manually operated fasteners for said fingers and bracket for holding the same in selected positions on said hollow tubular body, means fastening one of said fingers and said bracket together so that they slide in unison on said hollow body, a compression spring in the interior of said hollow body operative upon said bracket so as to yieldably urge it toward one end of said hollow body, and manual adjustment means associated with said bracket for imparting incremental movement to said one fingers relative to the other finger, whereby a range of inside diameters of apertures having size ratios of the order of 1 to 10 may be precisely measured, said hollow tubular body having an axially extending slot therein extending substantially end to end thereof to maximize the maximum distance of travel between said fingers, said slot being V-shaped, each of said fasteners having V-shaped shoulders thereon which engage said slot, whereby to circumferentially align said fingers and bracket on said hollow tubular body, the fastener for said bracket having an inner end which extends into the interior of said tubular body for engaging an end of said compression spring, and said fingers having respective protuberances on corresponding outside faces thereof, and said fingers having opposing inside faces thereon ground flat so as to minimize the minimum distance between said protuberances.

* * * * *